United States Patent Office 3,122,494
Patented Feb. 25, 1964

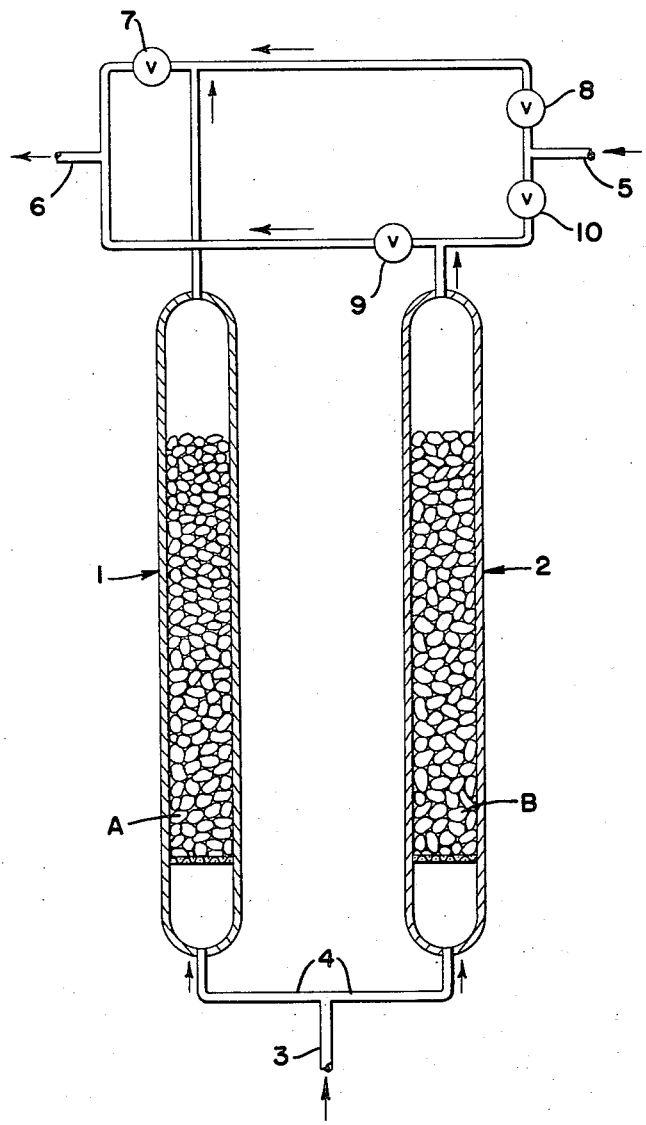
INVENTORS.
GLENN R. BROWN, &
ROBERT A. RIGHTMIRE

3,122,494
HYDROCARBON REFORMING PROCESS
Glenn R. Brown, Solon, and Robert A. Rightmire, Twinsburg, Ohio, assignors to The Standard Oil Company, Cleveland, Ohio, a corporation of Ohio
Filed Nov. 9, 1959, Ser. No. 851,798
9 Claims. (Cl. 208—63)

The present invention relates to a hydrocarbon refining process. More particularly, the invention relates to a process for upgrading hydrocarbons in the gasoline boiling range, e.g., low boiling straight-chain hydrocarbons such as pentane or hexane.

In many chemical reactions, the reaction is not quantitative due to thermodynamic equilibrium considerations and the process of the present invention is particularly applicable to this type of reaction, e.g., the reforming of hydrocarbons. The latter type of reaction is normally limited by thermodynamic equilibrium which precludes the quantitative conversion of the feed material. The usual method of conducting such reactions is to pass the feed material through a catalytic reforming zone and then separate the product from the unconverted feed material by fractional distillation and recycle the unconverted feed back to the reforming zone.

More specifically, in a process for converting normal pentane to isopentane, the procedure which has been followed heretofore is to pass the normal pentane into a catalytic isomerization zone and recover the effluent and then to separate the unconverted normal pentane from the isopentane by fractional distillation and recycle the normal pentane to the reaction zone. The present invention seeks to overcome the disadvantages of such prior art procedures by eliminating the need for resort to distillation facilities in the process.

In brief, the present invention is carried out by conducting the hydrocarbon reforming reaction in the presence of an adsorbent which selectively adsorbs normal paraffins so as to confine them in the reaction zone. The invention will be described in terms of the conversion of a normal paraffin to an isoparaffin and, more particularly, the conversion of normal pentane to isopentane. It should be understood, however, that the illustrative embodiment of this invention given below is not intended to limit the invention in any way and it will be apparent at once that the invention is applicable to other chemical reactions including reforming reactions involving other normal paraffins such as normal butane, normal hexane, etc. It follows that the process of this invention is also applicable to mixtures of normal paraffins, isoparaffins, naphthenes, aromatics, and/or other hydrocarbon types.

It is well known to those skilled in the art that normal paraffins may be converted to isoparaffins by vapor phase catalytic reactions. The process of the present invention utilizes these conventional isomerization techniques. However, the reaction zone is modified by the addition to the catalyst bed of a quantity of a selective adsorbent which will adsorb molecules of a given diameter but exclude molecules having a different diameter. One of the properties of such adsorbents is that adsorption occurs in a state of dynamic equilibrium so that molecules are constantly being adsorbed and at the same time being desorbed. It is this property of the adsorbents which gives rise to the outstanding advantages of the present process.

In the case of a vertical reactor wherein the feed is introduced at the bottom and flows upwardly through the bed of catalyst and the selective adsorbent, a band of normal paraffins will gradually move upwardly through the bed while at the same time the non-normal compounds will pass through the bed unhindered. Since the band of n-paraffins does move, it would gradually reach the point where it would leave the reaction zone along with the non-normal compounds and the advantages of the invention would be negatived. In order to avoid this, it is necessary to resort to some sort of cycling operation. This may be accomplished in a single bed by periodically switching the direction of flow in the bed from top to bottom and vice versa. A desirable alternative to the latter scheme is to employ more than one reaction zone with the feed being alternated between the various zones so that the net product issuing from the reaction zone will always be made up essentially of the reaction product while the feed material is entirely trapped within the system. This leads directly to the conclusion that the optimum way of operating the process of this invention involves the use of a pre-determined time cycle in which the feed is alternately fed to the various reaction zones employed in the process.

Any of the conventional isomerization catalysts may be employed in the process of this invention. In its broadest aspect, the invention is not restricted to isomerization catalysts but also includes other catalysts which are useful for reforming. One group of catalysts used in the isomerization operation comprises platinum or palladium composited with a cracking component. The percentage of the metal in the catalyst usually is between about 0.01 and about 10 percent by weight and more preferably between about 0.05 and about 1.5 percent by weight. The cracking component comprises any suitable cracking catalyst either natural or synthetic including acid treated clays and synthetic catalysts such as silica, alumina, silica-alumina, silica-zirconia, silica-magnesia, silica-thoria, silica-canadia, silica-alumina-zirconia, silica-alumina-magnesia, etc.

Another group of catalysts also useful in promoting isomerization reactions are those listed above and containing a combined halogen; for example, fluorine or chlorine, in a quantity between about 0.1 and about 8 percent by weight. One catalyst which has been found to be particularly useful in the process of this invention is a platinum-germanium catalyst of the type described in U.S. Patent 2,906,700 to Stine et al. Still another catalyst which may be employed with advantage in the process of this invention is a conventional platinum reforming catalyst which has incorporated therein a small amount of aluminum chloride such as the catalyst described in U.S. Patent 2,900,425 as the latter catalysts are particularly useful in low temperature isomerization reactions.

Still another group of catalysts comprises the oxides or sulfides of elements of group VI–B; for example, chromium, molybdenum, or tungsten, supported preferably on alumina but also on magnesia, natural clays, crushed firebrick, crushed silica, etc. In general, the chromium, molybdenum, or tungsten comprises only a small portion of the total catalyst mass, more usually between about 1 and about 10 weight percent. Yet another group of catalysts comprises heteropoly acids having at least one central acid group selected from the oxides or sulfides of elements of groups V–A and VI–A and outer acid groups in the ratio of about 3–12 to 1 selected from the oxides of elements of groups V–B and VI–B; for example, molybdenum acid iodate, phosphomolybdic acid, silico tungstic acid. These and other conventional solid reforming and isomerization catalysts are used within the scope of this invention.

Any solid selective adsorbent which selectively adsorbs straight-chain hydrocarbons to the substantial exclusion of non-straight-chain hydrocarbons can be employed in the practice of this invention. It is preferred, however, to employ as the selective adsorbent certain natural or synthetic zeolites or alumino-silicates such as calcium alumino-silicate which exhibit the property of a molecular sieve wherein the pores of the crystals have a molecular dimension and are of substantially uniform size. A particularly suitable solid adsorbent for straight-chain hydrocarbons is a calcium alumino-silicate; apparently, actually a sodium calcium alumino-silicate having a pore size or diameter of about 5 angstrom units which is sufficiently large to admit straight-chain hydrocarbons such as the normal paraffins and normal olefins to the substantial exclusion of a non-straight-chain naphthenic aromatic isoparaffinic and iso-olefinic hydrocarbon. This particular selective adsorbent is available in various sizes and one particularly suitable form is a finely divided powder having a particle size in the range of 0.5 to 5.0 microns exhibiting a bulk density in lbs./cu. ft. of 33 and a particle density in grams/cc. of 1.6.

Other suitable solid selective adsorbents include the synthetic and natural zeolites which when dehydrated may be described as crystalline zeolites having a rigid three dimensional anionic network and having interstitial dimensions sufficiently large to adsorb straight chain hydrocarbons but sufficiently small to exclude branched chain hydrocarbons possessing large molecular dimensions. The naturally occurring zeolite, chabazite, exhibits such desirable properties. Another suitable naturally occurring zeolite is an analcite, $NaAlSi_2O_6.H_2O$, which when dehydrated and when all or part of the sodium is replaced by an alkaline earth metal such as calcium by base exchange yields a material which may be represented by the formula

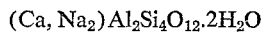

$$(Ca, Na_2)Al_2Si_4O_{12}.2H_2O$$

and which after suitable conditioning will adsorb straight-chain hydrocarbons to the substantial exclusion of non-straight-chain hydrocarbons. Naturally occurring or synthetically prepared phacolite, gmelinite, harmotone, and the like or suitable base exchange modifications of these zeolites are also useful in this invention. Other solid inorganic or mineral selective adsorbents are known and may be employed in the practice of this invention. It is contemplated that selective adsorbents having the property of selectively adsorbing straight-chain hydrocarbons to the substantial exclusion of non-straight-chain hydrocarbons in the manner of a molecular sieve may be obtained by suitable treatment of various oxide gels, especially metal oxide gels of a polyvalent amphoteric metal oxide.

In general, the materials which may be processed by means of this invention include low boiling normal paraffin hydrocarbons such as normal butane, normal pentane, normal hexane, etc. A valuable source of isomerization feed materials lies in refinery process streams, which are usually rich in normal paraffins, particularly the lower boiling of these compounds. Typical examples of refinery fractions from which normal paraffins are readily obtained are straight-run naphthas, straight-run and cracked gasolines and gases from crude and cracking units. In preparing an isomerization feed material, it is not necessary to concentrate the normal paraffins therein and this is an outstanding advantage of our process.

The isomerization of low boiling straight-run paraffins is preferably carried out at temperatures between about 750° F. and about 850° F. Temperatures as low as 200° F. and as high as 950° F. may be used; however, the reaction rate is quite low with most catalysts at the lower temperatures and at temperatures above 850° F. undesirable side reactions accompanied by carbon depositions take place. To initiate the reaction and provide a vaporized feed the reactants are preheated, preferably to about the reaction zone temperature. The reaction pressure may be varied over a wide range; however, more usually a pressure of between about 150 p.s.i.g. and about 500 p.s.i.g. is maintained in the reaction zone. It is generally desirable to operate at a space velocity between about 0.5 and about 10 pounds of hydrocarbon per hour per pound of catalyst. Operation in the lower portion of this range is preferred inasmuch as the degree of conversion decreases with increasing space velocity.

The hydrogen to hydrocarbon molar ratio is preferably maintained between about 0.5 and about 12. From the standpoint of isomerization it is preferred to maintain the hydrogen concentration at a minimum, although extended operation at ratios of below about 0.7 lowers the activity of the catalyst substantially. Nevertheless, it may be desirable or even necessary in the process of this invention to use fairly high hydrogen ratios in order to effectively accomplish the desorption of the sieves, but this is fortuitous since it also tends to prevent the fouling of the catalyst and makes possible long runs without need for regeneration. Also, operation over lengthy periods at temperatures above about 850° F. causes catalyst contamination from carbonaceous materials due to cracking. By controlling the operating conditions within the general ranges given it is possible to isomerize for extended periods of time without regenerating or replacing the catalyst.

Although small in extent, some cracking does take place along with the isomerization reaction. Because of this, it is necessary to add small amounts of hydrogen to the reaction in order to maintain a constant hydrogen concentration. More usually, the amount of make-up hydrogen required varies between about 20 and about 100 standard cubic feet per barrel of normal paraffin feed.

The ratio of the molecular sieve to the catalyst in the reaction zone is an important feature of this process. Weight ratios in the range of 0.5 to 20 pounds of adsorbent per pound of catalyst are operable. In general, it may be said that the adsorbent should be present in excess, and oftentimes it is desirable to operate with a weight ratio of sieves to catalyst on the order of about 5:1. On the other hand, the temperature and pressure at which the process is operated is determined to a great extent by the reaction which is being carried out and the type of catalyst employed to catalyze that reaction will, of course, influence the operating conditions. In order to minimize the amount of adsorbent which is required in the various reaction zones of the process, it is desirable to have a relatively short cycle time, i.e., on the order of about 1 to 20 minutes. The short cycle time minimizes the possibility that feed material will be carried out of the reaction zone before it is converted to the desired product. It is also obvious that the process has a physical limitation in that the feed material may not be introduced at a rate which is greater than the weight at which it is converted to the desired product.

We shall now proceed to a consideration of the attached patent drawing which will facilitate the explanation of the method of this invention. This drawing is merely schematic and it does not include any of the mechanical details of the equipment which would be employed in carrying out the process of this invention. A description of this drawing now follows.

The vessels 1 and 2 contain the fixed beds A and B which comprise mixtures of catalyst and solid adsorbent. The beds A and B constitute the reaction zones of the process. Feed is introduced to the bottom of the reaction zone by means of the lines 3 and 4. Hydrogen is introduced to the reaction vessels through line 5 and the product plus hydrogen leaves the reaction zone through line 6. The flow of the feed in the vessels 1 and 2 is controlled by manipulation of the valves 7, 8, 9 and 10. When the valve 8 is open, the valve 10 is closed and the valve 7 is closed while the valve 9 is open. During this cycle hydrogen will flow through line 5 and through valve 8 into vessel 1 subsequently through the bed A and through line 4 where it will pick up feed entering through line 3 and pass it into vessel 2 and through the bed B and it will exit through the valve 9 and line 6. When the cycle is switched, valves 8 and 9 are closed while the valves 10 and 7 are open. In this operation the hydrogen entering through line 5 flows through valve 10 and down into vessel 2 subsequently through the bed B and into line 4 where it again picks up feed entering through the line 3. The mixture of feed and hydrogen plus the hydrocarbons which are desorbed from bed B then flows into vessel 1 through the bed A and out through valve 7 and line 6. The hydrogen and the product of the process which leaves through line 6 is sent to a separator (not shown) and the hydrogen is recycled to the process.

It is important to note that the hydrogen is always purging at least one bed so that at the end of a given cycle the bed which is being desorbed is relatively free of adsorbed material.

One of the inherent features of beds A and B is that the loading of the beds begins at the bottom and proceeds upwardly in a sharp front through the bed. This sharp front must be maintained within the system so that normal paraffins which are adsorbed are held in the system while the unadsorbed isoparaffins are free to leave through the effluent line 6. The beds can be run through numerous cycles without any need for regeneration or other treatment, but it is contemplated that the process can be halted from time to time to permit regeneration of the beds. It is, of course, obvious that means to maintain the beds A and B at the desired reaction temperature may be required. However, these means are conventional and form no part of this invention; and, consequently, they are not shown on the drawing. It is also obvious that the method of this invention is by no means limited to an operation in which only two beds are employed but three or more beds can be manifolded together and operated in cycles within the scope of this invention.

In general, the process is operated with all of the reaction zones at the same temperature and pressure, but this is in no way critical and there is no reason, save for convenience, that the beds could not be operated at varying temperatures and pressures. As mentioned heretofore, the temperatures and pressures at which the process is operated are determined to a large extent by the reaction being carried out and the type of catalyst employed to catalyze that reaction.

As pointed out heretofore, the operability of the process depends upon the existence of a band of n-paraffins which moves through the sieve catalyst bed. This band has a sharp front with a fairly long tail. The process of this invention makes it possible to keep the sharp front end of the band within the reaction bed at all times. It is this feature of the process which limits the process to a fixed bed operation as a fluidized bed would negative the advantageous results achieved by means of this invention.

Having described the general operating conditions for the process of this invention, we shall now proceed to a description of an illustrative embodiment of the process.

Two reaction vessels of the type shown in the patent drawing were filled with equal amounts of a mixture of a synthetic calcium alumino-silicate having an average pore diameter of 5 Angstroms and a platinum germanium catalyst having the following approximate composition.

| Component: | Weight percent |
| --- | --- |
| $Al_2O_3$ | 99.23 |
| Pt | 0.35 |
| Ge | 0.07 |
| F | 0.35 |

The weight ratio of sieves to the catalysts in the beds was 4:1. The vessels were maintained at a temperature of 825° F. and a pressure of 400 p.s.i.g. throughout the run. During this run the LVVH was 0.67 and the hydrogen to hydrocarbon molar ratio was 4:1. The feed to the process comprised 60% n-$C_5$ and 40% i-$C_5$. The cycle time employed was eight minutes. For the first six cycles the effluent from the process was made up of substantially pure isopentane and this was expected since it would take this amount of time before the sieves in the beds would become loaded. It was expected that the advantages of the process would begin to show after about the seventh cycle and this turned out to be the case as is demonstrated by the data presented in the following table.

| Cycle number: | Percent i-$C_5$ in total $C_5$ fraction of effluent |
| --- | --- |
| 7 | 100 |
| 8 | 100 |
| 9 | 100 |
| 10 | 99.66 |
| 11 | 96.77 |
| 12 | 94.78 |

The advantages obtainable by means of this invention are apparent from an examination of this data. It is noted that the total product collected during the run had an i-C content exceeding 95%. It should be remembered that before the invention of this process it was not possible to obtain a product in which the i-$C_5$ content exceeded the thermodynamic equilibrium value which in this case would have been about 58%. Thus, the process of this invention makes it possible to dispense with the expensive distillation equipment which is required in conventional isomerization processes.

Many modifications of the process described in this application will undoubtedly occur to those skilled in the art. However, this application for Letters Patent is intended to cover all such modifications as would reasonably fall within the scope of the appended claims.

We claim:

1. A method of conducting a hydrocarbon reforming process which comprises the following steps: (1) introducing a reforming hydrocarbon mixture containing a normal hydrocarbon together with hydrogen to a first reaction zone maintained under reforming conditions and containing a fixed-bed physical mixture of a reforming catalyst and a molecular sieve adsorbent having a uniform pore diameter of about 5 angstrom units, (2) after a pre-determined period of time diverting said reforming hydrocarbon mixture to a second reaction zone maintained under reforming conditions and containing a fixed-bed physical mixture of said catalyst and a molecular sieve adsorbent having a uniform pore diameter of about 5 angstrom units while simultaneously passing hydrogen through said first reaction zone whereby the adsorbent in said zone becomes relatively desorbed and combining the hydrogen and desorbed hydrocarbons from said first reaction zone with the feed being introduced into said second reaction zone, (3) after a pre-determined period of time diverting said reforming hydrocarbon mixture from said second reaction zone to said first reaction zone while at the same time passing hydrogen through said second reaction zone and combining said hydrogen and desorbed hydrocarbons with the feed being introduced to said first reaction zone, (4) continuing to alternate the feed between said first reaction zone and said second reaction zone as described in steps (2) and (3).

2. The method of claim 1 in which the reforming process and catalyst therefor is one of converting a normal paraffin to an iso-paraffin.

3. The method of claim 1 in which the reforming process and catalyst therefor is one of converting a normal paraffin to cyclic hydrocarbons.

4. The method of claim 3 in which the cyclic hydrocarbon is an aromatic.

5. A method of conducting a hydrocarbon isomerization process which comprises the following steps: (1) introducing a normal paraffin together with hydrogen to a first reaction zone maintained under isomerization conditions and containing a fixed-bed physical mixture of an isomerization catalyst and a molecular sieve adsorbent having a uniform pore diameter of about 5 angstrom units, (2) after a pre-determined period of time diverting said normal paraffin to a second reaction zone maintained under isomerization conditions and containing a fixed-bed physical mixture of isomerization catalyst and a molecular sieve adsorbent having a uniform pore diameter of about 5 angstrom units while simultaneously passing hydrogen through said first reaction zone whereby the adsorbent in said zone becomes relatively desorbed and combining the hydrogen and desorbed hydrocarbons from said first reaction zone with the feed being introduced into said second reaction zone, (3) after a pre-determined period of time diverting said normal paraffin from said second reaction zone to said first reaction zone while at the same time passing hydrogen through said second reaction zone and combining said hydrogen and desorbed hydrocarbons with the feed being introduced to said first reaction zone, (4) continuing to alternate the feed between said first reaction zone and said second reaction zone as described in steps (2) and (3).

6. A method of conducting a hydrocarbon isomerization process which comprises the following steps: (1) introducing a light naphtha together with hydrogen to a first reaction zone maintained under isomerization conditions and containing a fixed-bed physical mixture of an isomerization catalyst and a molecular sieve adsorbent having a uniform pore diameter of about 5 angstrom units, (2) after a pre-determined period of time diverting said light naphtha to a second reaction zone maintained under isomerization conditions and containing a fixed-bed physical mixture of isomerization catalyst and a molecular sieve adsorbent having a uniform pore diameter of about 5 angstrom units while simultaneously passing hydrogen through said first reaction zone whereby the adsorbent in said zone becomes relatively desorbed and combining the hydrogen and desorbed hydrocarbons from said first reaction zone with the feed being introduced into said second reaction zone, (3) after a pre-determined period of time diverting said light naphtha from said second reaction zone to said first reaction zone while at the same time passing hydrogen through said second reaction zone and combining said hydrogen and desorbed hydrocarbons with the feed being introduced to said first reaction zone, (4) continuing to alternate the feed between said first reaction zone and said second reaction zone as described in steps (2) and (3).

7. A method of conducting a hydrocarbon isomerization process which comprises the following steps: (1) introducing normal pentane together with hydrogen to a first reaction zone maintained under isomerization conditions and containing a fixed-bed physical mixture of an isomerization catalyst and a molecular sieve adsorbent having a uniform pore diameter of about 5 angstrom units, (2) after a pre-determined period of time diverting said normal pentane to a second reaction zone maintained under isomerization conditions and containing a fixed-bed physical mixture of isomerization catalyst and a molecular sieve adsorbent having a uniform pore diameter of about 5 angstrom units while simultaneously passing hydrogen through said first reactioin zone whereby the adsorbent in said zone becomes relatively desorbed and combining the hydrogen and desorbed hydrocarbons from said first reaction zone with the feed being introduced into said second reaction zone, (3) after a pre-determined period of time diverting said normal pentane from said second reaction zone to said first reaction zone while at the same time passing hydrogen through said second reaction zone and combining said hydrogen and desorbed hydrocarbons with the feed being introduced to said first reaction zone, (4) continuing to alternate the feed between said first reaction zone and said second reaction zone as described in steps (2) and (3).

8. A method of conducting a hydrocarbon isomerization process which comprises the following steps: (1) introducing normal butane together with hydrogen to a first reaction zone maintained under isomerization conditions and containing a fixed-bed physical mixture of an isomerization catalyst and a molecular sieve adsorbent having a uniform pore diameter of about 5 angstrom units, (2) after a pre-determined period of time diverting said normal butane to a second reaction zone maintained under isomerization conditions and containing a fixed-bed physical mixture of isomerization catalyst and a molecular sieve adsorbent having a uniform pore diameter of about 5 angstrom units while simultaneously passing hydrogen through said first reaction zone whereby the adsorbent in said zone becomes relatively desorbed and combining the hydrogen and desorbed hydrocarbons from said first reaction zone with the feed being introduced into said second reaction zone, (3) after a pre-determined period of time diverting said normal butane from said second reaction zone to said first reaction zone while at the same time passing hydrogen through said second reaction zone and combining said hydrogen and desorbed hydrocarbons with the feed being introduced to said first reaction zone, (4) continuing to alternate the feed between said first reaction zone and said second reaciton zone as described in steps (2) and (3).

9. A method of conducting a hydrocarbon isomerization process which comprises the following steps: (1) introducing normal hexane together with hydrogen to a first reaction zone maintained under isomerization conditions and containing a fixed-bed physical mixture of an isomerization catalyst and a molecular sieve adsorbent having a uniform pore diameter of about 5 angstrom units, (2) after a pre-determined period of time diverting said normal hexane to a second reaction zone maintained under isomerization conditions and containing a fixed-bed physical mixture of isomerization catalyst and a molecular sieve adsorbent having a uniform pore diameter of about 5 angstrom units while simultaneously passing hydrogen through said first reaction zone whereby the adsorbent in said zone becomes relatively desorbed and combining the hydrogen and desorbed hydrocarbons from said first reaction zone with the feed being introduced into said second reaction zone, (3) after a pre-determined period of time diverting said normal hexane from said second reaction zone to said first reaction zone while at the same time passing hydrogen through said second reaction zone and combining said hydrogen and desorbed hydrocarbons with the feed being introduced to said first reaction zone, (4) continuing to alternate the feed between said first reaction zone and said second reaction zone as described in steps (2) and (3).

References Cited in the file of this patent

UNITED STATES PATENTS

| | | |
|---|---|---|
| 2,834,429 | Kinsella et al. | May 13, 1958 |
| 2,859,170 | Dickens et al. | Nov. 4, 1958 |
| 2,880,162 | Moore | Mar. 31, 1959 |
| 2,891,902 | Hess et al. | June 23, 1959 |
| 2,917,449 | Christensen et al. | Dec. 15, 1959 |
| 2,921,104 | Haensel | Jan. 12, 1960 |
| 2,962,435 | Fleck et al. | Nov. 29, 1960 |
| 2,971,904 | Gladrow et al. | Feb. 14, 1961 |